(12) United States Patent
Nichols

(10) Patent No.: US 10,195,993 B2
(45) Date of Patent: Feb. 5, 2019

(54) REAR BACKUP SIDEVIEW MIRROR ASSEMBLY

(71) Applicant: Walter Lee Nichols, Memphis, TN (US)

(72) Inventor: Walter Lee Nichols, Memphis, TN (US)

( * ) Notice: Subject to any disclaimer, the term of this patent is extended or adjusted under 35 U.S.C. 154(b) by 0 days.

(21) Appl. No.: 15/452,340

(22) Filed: Mar. 7, 2017

(65) Prior Publication Data

US 2017/0174134 A1    Jun. 22, 2017

Related U.S. Application Data

(63) Continuation-in-part of application No. 14/680,415, filed on Apr. 7, 2015, now abandoned.

(51) Int. Cl.
| | | |
|---|---|---|
| *B60R 1/00* | (2006.01) | |
| *B60R 1/06* | (2006.01) | |
| *B60R 1/08* | (2006.01) | |

(52) U.S. Cl.
CPC ............... *B60R 1/007* (2013.01); *B60R 1/06* (2013.01); *B60R 1/081* (2013.01)

(58) Field of Classification Search
CPC .. B60R 1/06; B60R 1/04; B60R 1/081; B60R 1/007; B60R 1/008; B60R 1/006
USPC ....... 359/843, 844, 841, 850, 857, 859, 860, 359/863
See application file for complete search history.

(56) References Cited

U.S. PATENT DOCUMENTS

| | | | |
|---|---|---|---|
| 6,715,893 B2 | 4/2004 | Martinson | |
| 6,871,971 B2 | 3/2005 | Morrison | |
| 6,979,089 B2 | 12/2005 | Martinson | |
| 7,137,716 B2 * | 11/2006 | Bogard | B60R 1/006 359/855 |
| 7,147,335 B1 | 12/2006 | Dickerson | |
| 7,422,337 B1 | 9/2008 | Fetherson | |
| 7,780,299 B2 | 8/2010 | Martinson | |
| 2002/0186481 A1 | 12/2002 | Martinson | |

* cited by examiner

*Primary Examiner* — Jade R Chwasz
(74) *Attorney, Agent, or Firm* — David J. Kreher

(57) ABSTRACT

A rear backup sideview mirror assembly to be used in conjunction with a vehicle's interior rearview mirrors to view other motor vehicles moving in a side to lateral direction. The rearview mirror assembly, located on the rear of the vehicle that allows the user to see laterally away from the vehicle in both directions for oncoming obstructions and down behind the vehicle in order to observe objects that may not appear in the rearview mirror but are behind the vehicle.

2 Claims, 5 Drawing Sheets

REAR BACKUP SIDEVIEW MIRROR ASSEMBLY

CROSS-REFERENCE TO RELATED APPLICATIONS

61/996,493 May, 2014 Nichols

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC

Not Applicable

DESCRIPTION

Field of the Invention

This disclosure relates to an assembly that allows the driver of a vehicle to obtain the view of incoming traffic where the incoming traffic would be headed toward the passenger's side or driver's side of the vehicle when the vehicle operated in reverse, with the use of a rear backup sideview mirror assembly.

Background of the Invention

This application is a continuation in part of U.S. patent application Ser. No. 14/680,415 filed Apr. 7, 2015. The benefit of the earlier filing date of the aforementioned U.S. patent application Ser. No. 14/680,415 is hereby claimed.

This application is a Nonprovisional Application of the Provisional Application filed under U.S. Patent Application No. 61/996,493 filed May 8, 2014. The benefit of the earlier filing date of the aforementioned Provisional U.S. Patent Application No. 61/996,493 is hereby claimed.

When the driver of a vehicle operates said vehicle in reverse, the driver does not always have a clear view of oncoming traffic, for instance, when the vehicle is parked between two cars in a parking lot. In this instance, the driver's view is obstructed by the vehicles on either side of the vehicle the driver is operating and the driver cannot see oncoming traffic. The present disclosure reveals a rear backup sideview mirror assembly that when used in conjunction with any of the existing vehicle rearview mirror, driver's sideview mirror, or passenger's sideview mirror, would allow the driver a perspective of oncoming traffic that would otherwise collide with driver's vehicle.

Several attempts have been made to create lateral view mirror assemblies, all of which can be distinguished from the present disclosure:

In U.S. Pat. No. 7,780,299, Martinson discloses a lateral view mirror assembly for attachment to the rear of a vehicle in order to obtain lateral views of oncoming traffic, whereas the present disclosure reveals an apparatus that attaches to the rear of a vehicle in order to obtain lateral views of oncoming traffic as well as an additional view of traffic coming from the rear, which is otherwise partially obstructed by the apparatus.

In U.S. Pat. No. 7,422,337, Fetherston discloses a lateral view mirror assembly for attachment to the rear of a vehicle in order to obtain lateral views of oncoming traffic, along with a leveling means for the same, whereas the present disclosure reveals an apparatus that attaches to the rear of a vehicle in order to obtain lateral views of oncoming traffic as well as an additional view of traffic coming from the rear, which is otherwise partially obstructed by the apparatus.

In U.S. Pat. No. 7,147,335, Dickinson discloses a pair of lateral view mirror assemblies for attachment to the driver's side rear of a vehicle or the passenger's side rear of the vehicle in order to obtain lateral views of oncoming traffic, whereas the present disclosure reveals a single apparatus that attaches to either the driver's side rear of a vehicle or the passenger's side rear of the vehicle in order to obtain lateral views of oncoming traffic.

In U.S. Pat. No. 6,979,089, Martinson discloses a pair of mirror assemblies for use with minivans and SUV's that are attached on the inside of the vehicle, to be used with the rearview mirror, that allows the driver a view laterally and downwardly, whereas the present apparatus is a single apparatus attached to the exterior of a vehicle, used in conjunction with either the rearview mirror, driver's sideview mirror, or passenger's sideview mirror, that allows the driver to obtain to obtain lateral views of oncoming traffic.

In U.S. Pat. No. 6,871,971, Morrison discloses a mirror attached inside a vehicle that provides the user with an oblique angle of oncoming traffic, whereas the present apparatus is a single apparatus attached to the exterior of a vehicle, used in conjunction with either the rearview mirror, driver's sideview mirror, or passenger's sideview mirror, that allows the driver to obtain to obtain lateral views of oncoming traffic.

In U.S. Pat. No. 6,799,857, Martinson discloses a pair of mirrors used in conjunction with the rearview mirror that allows the driver to obtain to obtain lateral views of oncoming traffic, whereas the present apparatus is a single apparatus attached to the exterior of a vehicle, used in conjunction with either the rearview mirror, driver's sideview mirror, or passenger's sideview mirror, that allows the driver to obtain to obtain lateral views of oncoming traffic.

In U.S. Pat. No. 6,715,893, Martinson discloses a pair of mirrors used in conjunction with the rearview mirror that allows the driver to obtain to obtain lateral views of oncoming traffic, whereas the present apparatus is a single apparatus attached to the exterior of a vehicle, used in conjunction with either the rearview mirror, driver's sideview mirror, or passenger's sideview mirror, that allows the driver to obtain to obtain lateral views of oncoming traffic.

In U.S. Pat. App. No 2002/01864810 Martinson discloses a mirror assembly to be used with the rearview mirror that is attached to the rear of a vehicle that allows the driver to obtain to obtain lateral views of oncoming traffic, whereas the present disclosure reveals an apparatus that attaches to the rear of a vehicle in order to obtain lateral views of oncoming traffic as well as an additional view of traffic coming from the rear, which is otherwise partially obstructed by the apparatus. Martinson also reveals a pair of mirrors attached to the outside driver's side rear of the vehicle and the passerger's side rear of a vehicle, that allow the driver to obtain to obtain lateral views of oncoming traffic, whereas the present apparatus is a single apparatus attached to the exterior of a vehicle, used in conjunction with either the driver's sideview mirror or passenger's sideview mirror, that allows the driver to obtain to obtain lateral views of oncoming traffic.

SUMMARY OF THE INVENTION

The present disclosure is a rear backup sideview mirror assembly to enable the driver of the vehicle to see the lateral views from the back of a vehicle to aid in the prevention of accidents when operating the vehicle in reverse.

The first embodiment of the rear backup sideview mirror assembly is a rearview mirror assembly to be used in conjunction with the rearview mirror of the vehicle.

To optimize the perspective view of the driver, convex mirrors are used. Regarding the use of convex mirrors, according to the optical principal Snell's Law, as regards to viewing an image in a mirror generally, the angle of incidence is equal to the angle of refraction. When a flat mirror is used to observe a reflection, the angle between the surface of the mirror and incoming view from the driver or the angle of reflection, is the same as the angle between the surface of the mirror and view from the image being viewed, or the angle of incidence and that angle is the same across the entire surface of the mirror. With the use of a convex mirror, the same optical principal applies but because of the curvature of the mirror surface, a different angle of reflection and angle of incidence across the surface of the mirror, which results in a wider perspective of view and makes the image being viewed appear closer to the mirror than the actual distance to the source of the image. The use of convex mirrors with the rear backup sideview mirror assembly means that objects can be detected that would otherwise not be detectable in a flat mirror because of the wider perspective and the enlarged image improves the visibility of those objects.

The first embodiment of the rear backup sideview mirror assembly is a rearview mirror assembly wherein the driver of the vehicle can look into the rearview mirror of the vehicle to obtain a view of the rearview mirror assembly which is located on the rear of the vehicle and obtain from the rearview mirror assembly perspectives of oncoming traffic toward the driver's side of the vehicle, toward the passenger's side of the vehicle, and a downward perspective to see if anything is behind the vehicle but out of the driver's view.

The base of the any of the three revealed embodiments of the assembly is attached to the vehicle by a plurality of attachment means, which could include a plurality of threaded fasters, a plurality of suction cups, a plurality of magnets or a plurality of straps. Any of the plurality of convex mirrors on each of the assemblies may be adjustable to optimize the view of oncoming traffic once the rear backup sideview mirror assembly is attached to the vehicle.

BRIEF DESCRIPTION OF THE SEVERAL VIEWS OF THE DRAWING

FIG. 4A [Deleted]
FIG. 4B [Deleted]
FIG. 4C [Deleted]
FIG. 4D [Deleted]
FIG. 4E [Deleted]
FIG. 5A [Deleted]
FIG. 5B [Deleted]
FIG. 5C [Deleted]
FIG. 5D [Deleted]
FIG. 5E [Deleted]

DETAILED DESCRIPTION OF THE INVENTION

Figure 1:
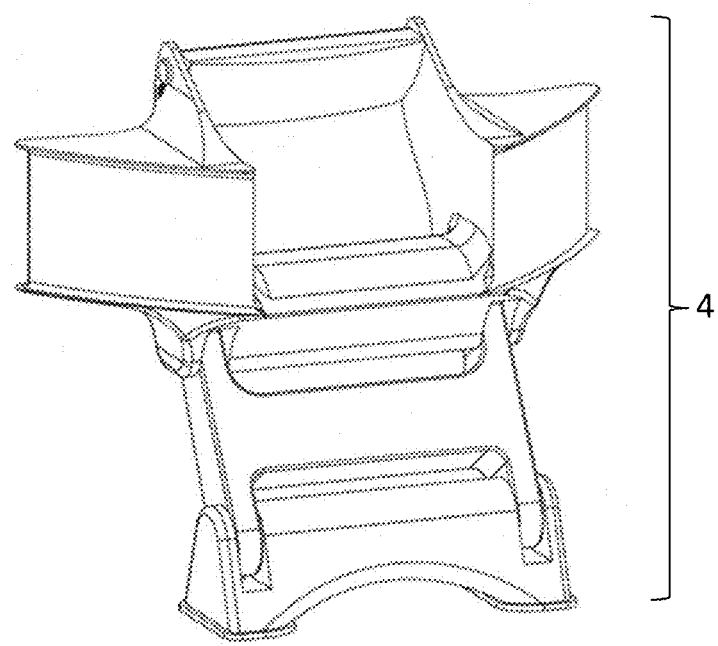
FIG. 1 is a view of the rear backup sideview mirror assembly.
Figure 2:
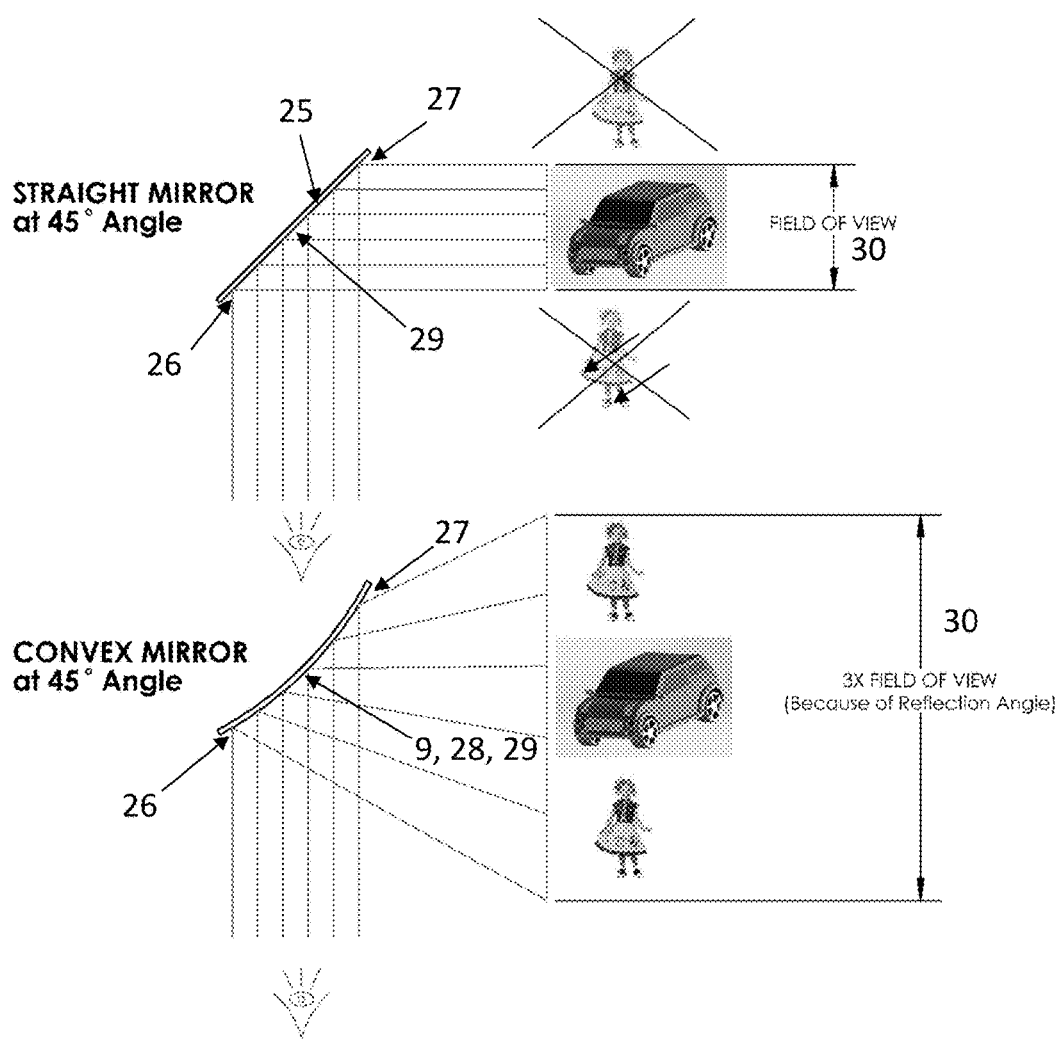
FIG. 2 is a view of the optical perspective difference between the use of a flat mirror and a convex mirror.
Figure 3:
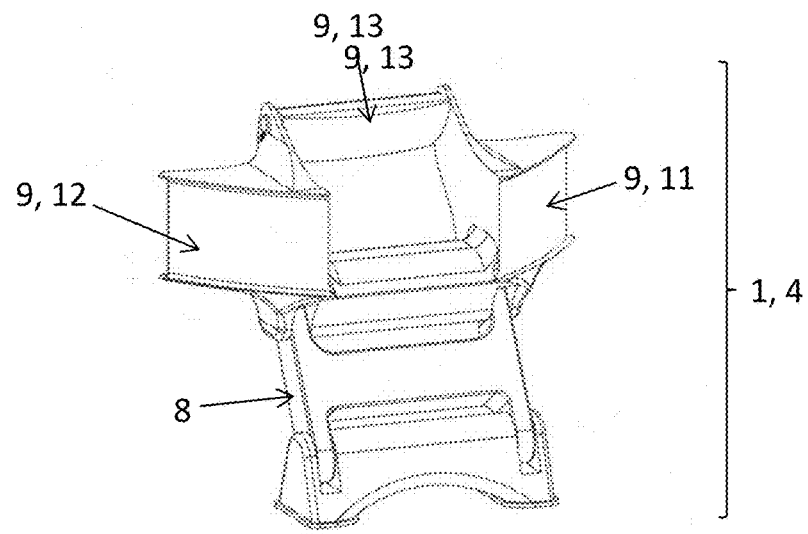
FIG. 3A is a view of the first embodiment of the rear backup sideview mirror assembly, the rearview mirror assembly.
FIG. 3B is a view of the first embodiment of the rear backup sideview mirror assembly, the rearview mirror assembly and where the plurality of convex mirrors are adjustable.
FIG. 3C is a view of the rearview mirror assembly in association with the rearview mirror of the vehicle, indicating the perspective visible to the driver relative to the driver's side lateral mirror, the passenger's side lateral mirror and the downward perspective visible to the driver relative to the rear assembly mirror with the use of a convex mirror.
FIG. 3D is a view of the underside of the rearview mirror assembly indicating the location of some of the plurality of attachment means.
FIG. 3E is a view of the rearview mirror assembly indicating as it is attached to a vehicle by a plurality of straps.
Figure 3B:
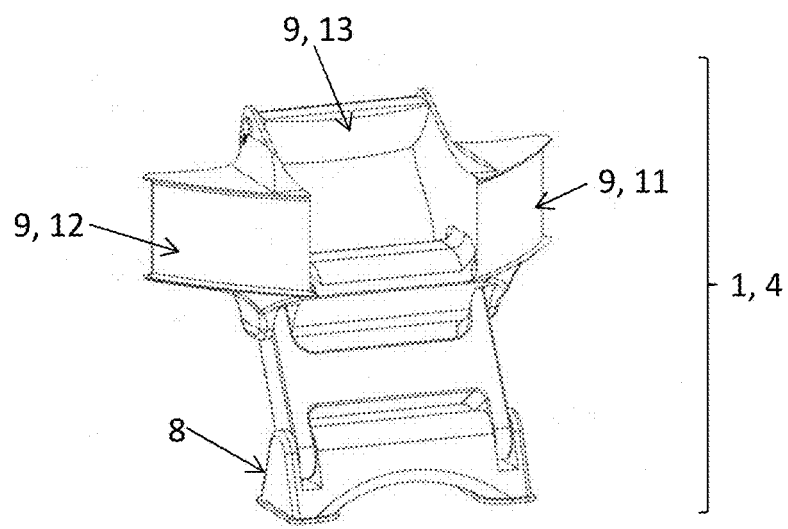
Figure 3C:
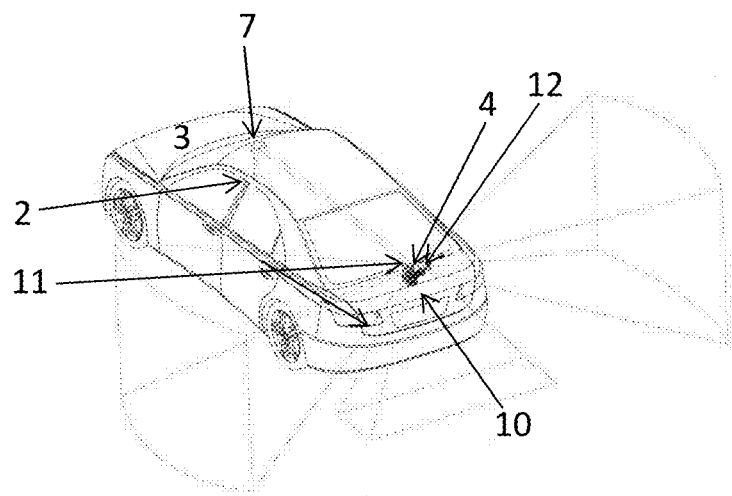
Figure 3D:
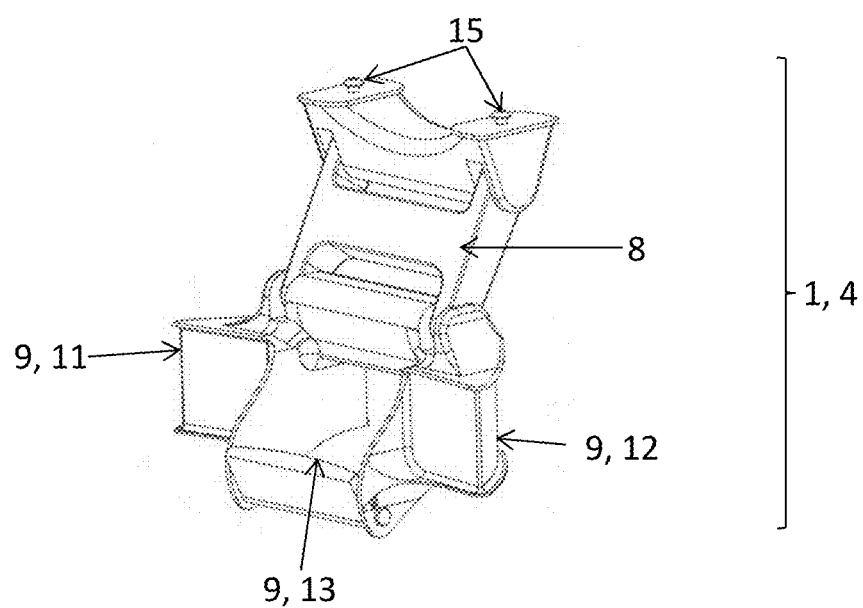
Figure 3E:
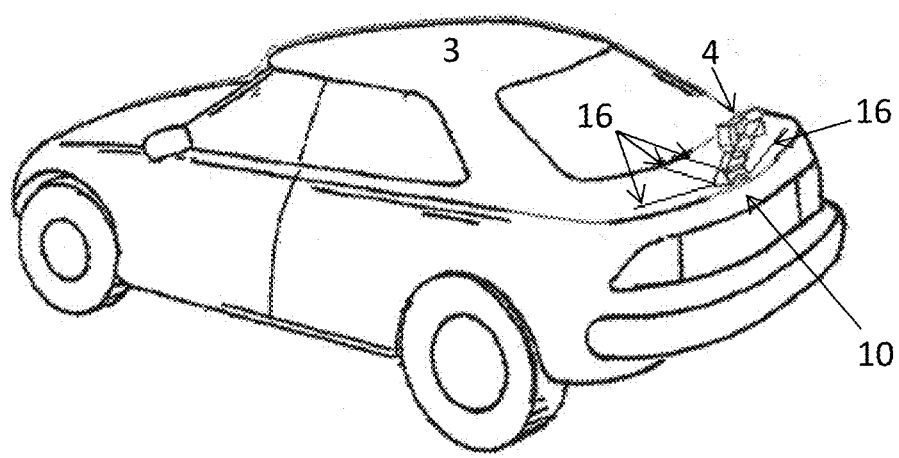

A rear backup sideview mirror assembly 1 to enable the driver 2 of a vehicle 3 to see the lateral views from the back of the vehicle 3 to aid in the prevention of accidents when operating the vehicle 3 in reverse wherein there are three embodiments, a rearview mirror assembly 4, a driver's sideview mirror assembly 5 and a passenger's sideview mirror assembly 6.

In each of the three embodiments, to optimize the perspective view of the driver, a plurality of convex mirrors 9 are used. Regarding the use of convex mirrors 9, according to the optical principal Snell's Law, as regards to viewing an image 30 in a mirror generally, the angle of incidence is equal to the angle of refraction. When a flat mirror 25 is used to observe a reflection, the angle between the surface 29 of the flat mirror 25 and incoming view, or the angle of reflection 26, is the same as the angle between the surface 29 of the flat mirror 25 and view from the image 30 being viewed, or the angle of incidence 27 and that angle is the same across the entire surface 29 of the flat mirror 25. With the use of a convex mirror 9, the same optical principal applies but because of the curvature 28 of the convex mirror 9 surface 29, a different angle of reflection 26 and angle of incidence 27 across the surface 29 of the convex mirror 9, which results in a wider perspective of view and makes the image 30 being viewed appear closer to the mirror than the actual distance to the source of the image 30. The use of a plurality of convex mirrors 9 with the rear backup sideview mirror assembly 1 means that objects can be detected that would otherwise not be detectable in a flat mirror 25 because of the wider perspective and the enlarged image 30 improves the visibility of those objects in the image 30.

The first embodiment 4 of the rear backup side view mirror assembly 1 is a rearview mirror assembly 4 that comprises a base 8 and a plurality of convex mirrors 9 wherein each of the plurality of convex mirrors 9 is attached to the base to form a single assembly, wherein the driver 2 of the vehicle 3 can look into the rearview mirror 7 of the vehicle 3 at the rearview mirror assembly 4 located on the rear 10 of the vehicle 3 and obtain the perspectives from the mirrors attached to the base 8. In this embodiment, the rearview mirror 7 is located centrally in the front window, within the compartment of a vehicle 3 and the base 8 and associated plurality of convex mirrors 9 are attached to the rear 10 of said vehicle 3. The first of the plurality of convex mirrors 9 is a driver's side lateral mirror 11. The second of the plurality of convex mirrors 9 is a passenger's side lateral mirror 12. The third of the plurality of convex mirrors 9 is the rear assembly mirror 13.

In the first embodiment 4, the driver's side lateral mirror 11 is positioned on the base 8 such that, when the driver 2 of the vehicle 3 looks into the rearview mirror 7, the view of the driver 2 includes the driver's side lateral mirror 11 and the perspective presented to the driver 2 from the driver's side lateral mirror 11 is of potential oncoming traffic heading towards the driver's side of the vehicle 3. In the first embodiment 4, the passenger's side lateral mirror 12 is positioned on the base 8 such that, when the driver 2 of the vehicle 3 looks into the rearview mirror 7, the view of the driver 2 includes the passenger's side lateral mirror 12 and the perspective presented to the driver 2 from the passenger's side lateral mirror 12 is of potential oncoming traffic heading towards the passenger's side of the vehicle 3.

The rear assembly mirror 13 faces downward such that, when the driver 2 looks into the rearview mirror 7, the perspective presented to the driver 2 includes the rear assembly mirror, which provides the driver 2 a view downward and behind the rear of the vehicle 3 so that the driver 2 can see if something is behind the vehicle 3 but not otherwise visible.

The base 8 of the rearview mirror assembly 4 is attached to the rear 10 of the vehicle 3 by a plurality of attachment means 15, which could include a plurality of threaded fasters, a plurality of suction cups, a plurality of magnets or a plurality of straps 16. Any of the plurality of convex mirrors 9 may be adjustable to optimize the view of oncoming traffic once the rear backup side view mirror assembly 1 is attached to the vehicle 3.

The base 8 of the passenger's sideview mirror assembly 6 is attached to the rear 10 of the vehicle 3 on the passenger's side 22 by a plurality of attachment means 15, which could include a plurality of threaded fasters, a plurality of suction cups, a plurality of magnets or a plurality of straps 16. Any of the plurality of convex mirrors 9 may be adjustable to optimize the view of oncoming traffic once the rear backup side view mirror assembly 1 is attached to the vehicle 3.

What is claimed:

1. A rear backup sideview mirror assembly to enable the driver of the vehicle to see the lateral views and behind the vehicle from the back of a vehicle to aid in the prevention of accidents when operating the vehicle in reverse comprising:
    a base and a three convex mirrors wherein each of the three convex mirrors is attached to the base to form a single assembly;
    wherein a rearview mirror is located centrally in the front window, within the compartment of a vehicle;
    wherein the base is attached to the rear of said vehicle by a plurality of attachment means;
    wherein the three convex mirrors are attached to the base;
    wherein there is a first convex mirror of the three convex mirrors, which is a driver's side lateral mirror;
    wherein there is a second convex mirror of the three convex mirrors, which is a passenger's side lateral mirror;
    wherein there is a third convex mirror of the three convex mirrors, which is a rear assembly mirror;
    wherein the driver's side lateral mirror is positioned on the base such that, when the driver of the vehicle looks into the rearview mirror, the view of the driver includes the driver's side lateral mirror and the perspective presented to the driver from the driver's side lateral mirror is of potential oncoming traffic heading towards the driver's side of the vehicle;
    wherein the passenger's side lateral mirror is positioned on the base such that, when the driver of the vehicle looks into the rearview mirror, the view of the driver includes the passenger's side lateral mirror and the perspective presented to the driver from the passenger's side lateral mirror is of potential oncoming traffic heading towards the passenger's side of the vehicle; and
    wherein the rear assembly mirror is positioned on the base such that when the driver looks into the rearview mirror, the perspective presented to the driver includes the rear assembly mirror, which provides the driver a view downward and behind the rear of the vehicle so that the driver can see if something is behind the vehicle but not otherwise visible.

2. The rear backup sideview mirror assembly of claim 1 where at least one of the three convex mirrors is adjustable to optimize the view of oncoming traffic once the rear backup sideview mirror assembly is attached to the vehicle.

* * * * *